(12) United States Patent
Wesel et al.

(10) Patent No.: US 12,519,564 B2
(45) Date of Patent: Jan. 6, 2026

(54) SYSTEMS AND METHODS FOR DUAL LIST DECODING OF CONVOLUTIONAL CODES

(71) Applicant: The Regents of the University of California, Oakland, CA (US)

(72) Inventors: Richard D. Wesel, Los Angeles, CA (US); Zihan Qu, Oakland, CA (US); Amaael Antonini, Pasadena, CA (US); Wenhui Sui, Mountain View, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 19/098,687

(22) Filed: Apr. 2, 2025

(65) Prior Publication Data
US 2025/0310030 A1    Oct. 2, 2025

Related U.S. Application Data

(60) Provisional application No. 63/573,380, filed on Apr. 2, 2024.

(51) Int. Cl.
*H04L 9/08*    (2006.01)
*H04L 1/00*    (2006.01)

(52) U.S. Cl.
CPC .......... *H04L 1/0048* (2013.01); *H04L 1/0054* (2013.01)

(58) Field of Classification Search
CPC ............................ H04L 1/0048; H04L 1/0054
See application file for complete search history.

(56) References Cited

U.S. PATENT DOCUMENTS

| 6,754,290 | B1 | 6/2004 | Halter |
| 2010/0031122 | A1 | 2/2010 | Laprade et al. |
| 2011/0051832 | A1* | 3/2011 | Mergen ............... H04J 11/004 375/267 |
| 2016/0142074 | A1 | 5/2016 | Sham et al. |
| 2021/0004290 | A1 | 1/2021 | Chen et al. |

(Continued)

OTHER PUBLICATIONS

International Search Report and Written Opinion for International Application No. PCT/US2025/022828, Search completed Jun. 5, 2025, Mailed Jun. 18, 2025, 17 Pgs.

(Continued)

*Primary Examiner* — Jamal Javaid
(74) *Attorney, Agent, or Firm* — KPPB LLP

(57) ABSTRACT

Communication systems and methods are disclosed involving the transmission and reception of short block-length messages. In many embodiments, transmitters are utilized that encode messages by combing: at least a first partial codeword generated using a first encoder based upon a first convolutional code and a first expurgating linear function; and a second partial codeword generated by a second encoder based upon a second convolutional code and a second expurgating linear function. In a number of embodiments, receivers are utilized that decode received messages using a full decoder that reconstructs the transmitted message bits based upon: at least a first set of partial codewords produced by a first partial decoder based upon the first convolutional code and the first expurgating linear function; and a second set of partial codewords generated by a second partial decoder based upon the second convolutional code and the second expurgating linear function.

20 Claims, 10 Drawing Sheets

(56) References Cited

U.S. PATENT DOCUMENTS

2021/0306005 A1    9/2021   Sheiman et al.

OTHER PUBLICATIONS

Forney, Jr., "The Viterbi Aalgorithm", Proceedings of the IEEE, 1973, vol. 61, No. 3, pp. 268-278.

Lou et al., "Convolutional-Code-Specific CRC Code Design", IEEE Transactions on Communications, vol. 63, No. 10, Oct. 2015, 12 pgs., doi: 10.1109/TCOMM.2015.2459058.

Polyanskiy et al., "Channel Coding Rate in the Finite Blocklength Regime", IEEE Transactions on Information Theory, vol. 56, No. 5, May 2010, pp. 2307-2359, doi: 10.1109/TIT.2010.2043769.

Qiu et al., "Generalized Spatially-Coupled Parallel Concatenated Codes with Partial Repetition", In: arXiv; Feb. 24, 2022, [online] [retrieved on Jun. 4, 2025] Retrieved from the Internet, URL: https://arxiv.org/pdf/2201.09414.

Roder et al., "Fast Tree-Trellis List Viterbi Decoding", IEEE Transactions on Communications, 2006, vol. 54, No. 3, pp. 453-461.

Scarlett et al., "Multiuser Coding Techniques for Mismatched Decoding", In: arXiv; Nov. 26, 2013, [online] [retrieved on Jun. 4, 2025] Retrieved from the Internet, URL: https://www.researchgate.net/publication/258884648.

Wesel et al., "ELF Codes: Concatenated Codes with an Expurgating Linear Function as the Outer Code", In: arXiv, Aug. 1, 2023, Jun. 4, 2025, Retrieved from the Internet, URL: https://arxiv.org/abs/2306.07467.

Yang et al., "CRC-Aided List Decoding of Convolutional Codes in the Short Blocklength Regime", IEEE Transactions on Information Theory, vol. 68, No. 6, Feb. 2022, 23 pgs., doi: 10.1109/TIT.2022.3150717.

Yang et al., "Joint Design of Convolutional Code and CRC under Serial List Viterbi Decoding", IEEE Transactions on Communications, arXiv:1811.11932v1[cs.IT] Nov. 29, 2018, 11 pgs.

Yang et al., "Serial List Viterbi Decoding with CRC: Managing Errors, Erasures, and Complexity", IEEE Global Communications Conference (GLOBECOM), 2018, pp. 1-6, doi: 10.1109/GLOCOM.2018.8647589.

\* cited by examiner

SYSTEMS AND METHODS FOR DUAL LIST DECODING OF CONVOLUTIONAL CODES

CROSS-REFERENCE TO RELATED APPLICATIONS

The present invention claims priority to U.S. Provisional Patent Application Ser. No. 63/573,380 entitled "Systems and Methods for Dual List Decoding of Convolutional Codes" filed Apr. 2, 2024, the disclosures of which is herein incorporated by reference in its entirety.

STATEMENT OF FEDERALLY SPONSORED RESEARCH

This invention was made with government support under 2008918 awarded by the National Science Foundation. The government has certain rights in the invention.

FIELD OF THE INVENTION

The present invention relates generally to digital communications and, more specifically, to digital communications involving the transmission of short-block-length messages.

BACKGROUND

Digital communication systems are utilized to transfer data over a communication channel, such as (but not limited to) an optical, wired, and/or wireless communication channel. The Shannon-Hartley theorem enables a determination of the maximum rate at which information can be transmitted over a communication channel of a specified bandwidth in the presence of noise. The theorem establishes Shannon's channel capacity for such a communication link, which is a bound on the maximum amount of substantially error-free information per time unit that can be transmitted with a specified bandwidth in the presence of noise, assuming that the signal power is bounded (i.e. the maximum capacity of the channel at a given signal-to-noise (SNR) ratio).

Forward Error Correction (FEC) coding, or channel coding, is a technique that can be used for controlling errors in data transmission over unreliable or noisy channels. Shannon's theorem predicts the maximum possible efficiency that can be achieved by a Forward Error Correction (FEC) code but does not provide any insights into how to design such a code. Accordingly, coding theorists have attempted to develop FECs that can achieve efficiency approaching the Shannon limit.

Block codes are a category of FEC that work on a fixed-size number of bits or symbols. Practical block codes can generally be hard-decoded in polynomial time based on block length. Convolutional codes are a type of FEC that typically work on bit or symbol streams, which can be of arbitrary length and are often soft-decoded using an algorithm such as (but not limited to) the Viterbi algorithm. A convolutional code that is terminated can be considered to be a block code in that it encodes a fixed-size block of input data, but the block size of a convolutional code is generally arbitrary. Types of termination for convolutional codes include "tail-biting" and "zero-state termination."

During the 1990s, a number of different classes of capacity-approaching codes were discovered, or in the case of (Low-Density Parity Check) LDPC codes were rediscovered. The use of large block-length capacity-approaching codes significantly increased data rates that could be achieved within digital communication systems. Modern linear block codes, such as LDPC and Polar codes, are considered to be one class of "capacity-approaching" codes. A distinction is often drawn between classical or algebraic block codes (e.g. Bose-Chaudhuri-Hocquenghem (BCH), Golay, Hamming, and Reed-Solomon codes) that apply the algebraic properties of finite fields and modern linear block codes, such as (but not limited to) LDPC and Polar codes, which are characterized by bipartite graphs. Turbo codes constitute a second class of capacity-approaching codes that are based upon concatenated convolutional codes. Turbo coding is typically considered to involve an iterated soft-decoding scheme and an FEC that combines two or more relatively simple convolutional codes and an interleaver to produce a block code that can achieve performance approaching the Shannon limit. The first Turbo codes were parallel concatenated convolution codes, but subsequent Turbo codes have also utilized serially concatenated convolutional codes.

SUMMARY OF THE INVENTION

Communication systems and methods of communication in accordance with various embodiments of the invention involve the transmission and reception of short block-length messages. In many embodiments, transmitters are utilized that encode messages by combing: at least a first partial codeword generated using a first encoder based upon a first convolutional code and a first expurgating linear function; and a second partial codeword generated by a second encoder based upon a second convolutional code and a second expurgating linear function. In a number of embodiments, receivers are utilized that decode received messages using a full decoder that reconstructs the transmitted message bits based upon: at least a first set of partial codewords produced by a first partial decoder based upon the first convolutional code and the first expurgating linear function; and a second set of partial codewords generated by a second partial decoder based upon the second convolutional code and the second expurgating linear function.

A receiver for reconstructing a sequence of message bits from a sequence of noisy received encoded symbols in accordance with an embodiment of the invention includes: a full decoder capable of receiving the sequence of noisy received encoded symbols and outputting a reconstructed sequence of message bits. In addition, the full decoder further includes: a first partial decoder capable of processing a first subset of the sequence of noisy received encoded symbols to produce a first set of partial codewords that each correspond to a possible sequence of message bits using a first convolutional code and a first expurgating linear function, where the first subset of the sequence of noisy received encoded symbols corresponds to symbols of a first partial codeword; and a second partial decoder capable of processing a second subset of the sequence of noisy received encoded symbols to produce a second set of partial codewords that each correspond to a possible sequence of message bits using a second convolutional code and a second expurgating linear function, where the second subset of the sequence of received noisy encoded symbols corresponds to symbols of a second partial codeword, and the first and second subsets of the sequence of noisy received encoded symbols are distinct. Furthermore, the full decoder is also capable of reconstructing a sequence of message bits using the first set of partial codewords and the second set of partial codewords.

In a further embodiment, the reconstructed sequence of message bits corresponds to both a first partial codeword contained within the first set of partial codewords and a second partial codeword contained within the second set of partial codewords.

In another embodiment, the full decoder is further capable of directly decoding the sequence of noisy received encoded symbols using a full convolutional code when no suitable sequence of message bits can be found that corresponds to both a first partial codeword contained within the first set of partial codewords and a second partial codeword contained within the second set of partial codewords.

In a still further embodiment, the full decoder comprises a Viterbi decoder that is capable of directly decoding the sequence of noisy received encoded symbols using the full convolutional code.

In still another embodiment, a given sequence of message bits is suitable when the given sequence of message bits corresponds to a full codeword having a metric computed between the full codeword and the sequence of noisy received encoded symbols that is below a threshold.

In a yet further embodiment, the full decoder is capable of reconstructing the reconstructed sequence of message bits by choosing a sequence of message bits from sequences of message bits that correspond to a partial codeword contained within at least one of the first set of partial codewords and the second set of partial codewords. In addition, the chosen sequence of message bits corresponds to a full codeword having a best metric computed between the full codeword and the sequence of noisy received encoded symbols, where the best metric is determined by computing metrics for all sequences of message bits that correspond to a partial codeword contained within at least the first set of partial codewords and the second set of partial codewords.

In yet another embodiment, the first and second subsets of the sequence of noisy received encoded symbols are mutually exclusive.

In a further embodiment again, the first and second subsets of the sequence of noisy received encoded symbols are not mutually exclusive.

In another embodiment again, at least the first subset of the sequence of noisy received encoded symbols corresponds to encoded symbols that remain after some symbols have been punctured.

In a further additional embodiment, the first and second partial decoders are serial list Viterbi decoders.

In another additional embodiment, the first and second partial decoders are parallel list Viterbi decoders.

In a still yet further embodiment, each of the first and second subsets of the sequence of noisy received encoded symbols corresponds to symbols of a zero-terminated convolutional code.

In still yet another embodiment, each of the first and second subsets of the sequence of received noisy encoded symbols corresponds to symbols of a tail-biting convolutional code.

In a still further embodiment again, the first partial decoder is further capable of processing the first subset of the sequence of noisy received encoded symbols to produce the first set of partial codewords for the sequence of message bits using the first convolutional code and the first expurgating linear function by: producing a list of partial codewords containing the first set of partial codewords using a list decoder based upon the first convolutional code; and identifying the first set of partial codewords by verifying partial codewords from the list of partial codewords that pass a check based upon the first expurgating linear function.

A transmitter in accordance with an embodiment of the invention includes: a message encoder capable of receiving a sequence of message bits and outputting a sequence of encoded bits; a mapper, coupled to the message encoder, capable of mapping the full codeword to a sequence of symbols; and a modulator, coupled to the mapper, capable of outputting a signal for transmission via a communication channel based upon the sequence of symbols. In addition, the message encoder includes: a first encoder configured to receive the sequence of message bits and output a first partial codeword based upon a first convolutional code and a first expurgating linear function; and a second encoder configured to receive the sequence of message bits and output a second partial codeword based upon a second convolutional code and a second expurgating linear function. Furthermore, the message encoder is also configured to generate a full codeword by combining the first partial codeword and the second partial codeword.

In a further embodiment, each symbol in the sequence of symbols depends upon only one of the first partial codeword and the second partial codeword.

In another embodiment, at least one symbol in the sequence of symbols depends upon both the first partial codeword and the second partial codeword.

In a still further embodiment, each of the first convolutional code and the second convolutional code is a zero-terminated convolutional codes.

In still another embodiment, each of the first convolutional code and the second convolutional code is a tail-biting convolutional codes.

In a yet further embodiment, the bits of the first partial codeword and the bits of the second partial codeword are not mutually exclusive.

A receiver for reconstructing a sequence of message bits from a sequence of noisy received encoded symbols in accordance with another embodiment of the invention includes a full decoder capable of receiving the sequence of noisy received encoded symbols and outputting a reconstructed sequence of message bits. In addition, the full decoder further includes a first partial decoder capable of processing a first subset of the sequence of noisy received encoded symbols to produce a first set of partial codewords that each correspond to a possible sequence of message bits using a first convolutional code and a first expurgating linear function, where the first subset of the sequence of noisy received encoded symbols corresponds to symbols of a first partial codeword. Furthermore, the full decoder is also capable of reconstructing the reconstructed sequence of message bits by: choosing a sequence of message bits from sequences of message bits that correspond to a partial codeword contained within the first set of partial codewords; and wherein the chosen sequence of message bits corresponds to a full codeword having a best metric computed between the full codeword and the sequence of noisy received encoded symbols, where the best metric is determined by computing metrics for all sequences of message bits that correspond to a partial codeword contained within the first set of partial codewords.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
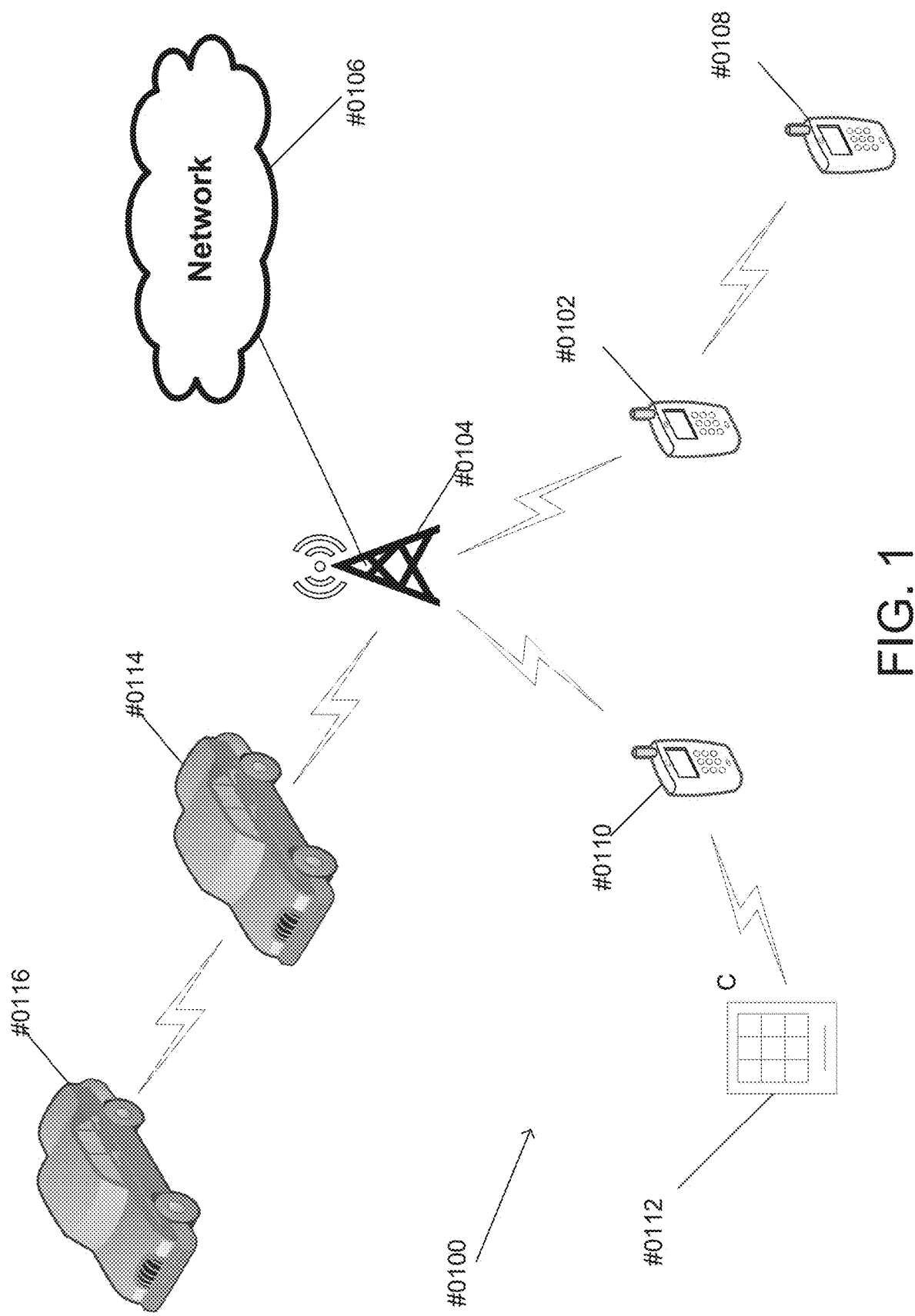
FIG. 1 illustrates a communication system that includes various devices that transmit short messages in accordance with various embodiments of the invention.

Turning now to the drawings, communication systems and methods that transmit and receive short block-length messages in accordance with various embodiments of the invention are illustrated. While capacity-approaching codes, such as (but not limited to) Low Density Parity Check (LDPC) codes, Turbo codes, and Polar codes, can achieve data rates approaching the Shannon limit at large block-lengths, the performance of these codes can deteriorate dramatically at short block-lengths. In a number of embodiments, transmitters and receivers use encoding and modulation techniques that are specifically designed for use with messages having short block-lengths. These messages can be referred to as short messages. In many instances, communication systems can use transmitters and receivers implemented in accordance with various embodiments of the invention that employ tail-biting convolutional codes (TBCC).

List decoding can be applied to a convolutional code that is concatenated with an outer cyclic redundancy check (CRC) code or expergating linear function (ELF) that is used to select from the list of codewords for the inner convolutional code. The overall concatenation of the outer CRC and inner convolutional code is an example of a catastrophic convolutional code, where the CRC polynomial is a common factor of the encoder polynomials of the overall concatenated code. Until now, non-catastrophic convolutional codes that do not share a common factor could not benefit from the complexity reduction possible with list decoding. Systems and methods in accordance with many embodiments decompose the original code into component codes that fully exclude some polynomials to allow an ELF to be factored from each component. Dual list decoding, where a separate list decoder is used for each of the component codes, can often find the ML codeword. In several embodiments, systems and methods include a fallback to regular Viterbi decoding, which can yield excellent FER performance and, in some cases, reduces the average complexity by half of what is required by always using regular Viterbi decoding. Further, increasing the redundancy of the component codes by including a shared polynomial can allow average complexity to be reduced by an order of magnitude.

In several embodiments, the receivers perform maximum likelihood (ML) decoding using a low-latency Viterbi decoder. Low-latency Viterbi decoders in accordance with several embodiments of the invention can be utilized in parallel processing hardware such as graphics processing units (GPUs). In certain embodiments, low-latency Viterbi decoders exploit the structure of trellis decoders to maximize the number of simultaneous operations capable of being performed by parallel-processing hardware.

Convolutional codes are typically decoded via the Viterbi algorithm, or the Bahl, Cocke, Jelinek, and Raviv (BCJR) algorithm to minimize symbol error rate. Low delay requirements have been a limiting factor for Viterbi decoders. Systems and methods in accordance with many embodiments of the invention implement a very low latency Viterbi decoder that can be used with (but is not limited to use with) TBCCs by leveraging the structure of the code trellis to pre-compute many operations. The pre-computed steps can then be used to speed up the decoding process to obtain a decoding latency proportional to the log of the block length. The lower delay may lead to an increase in the total number of operations that are performed. The use of simultaneous operations, however, can partially compensate for the additional operations and make the implementation efficient for processors capable of performing multiple instructions in parallel such as (but not limited to) vector processors and GPUs.

Low latency list decoders can significantly improve receiver performance. In a number of embodiments, the receiver includes two list decoders having similar decoding delays. Employing low latency list decoders within a communication system can enable the system to obtain a target performance using a simpler code (e.g. a code that may be more suitable for the system hardware). In certain embodiments, decoding methods can improve a code performance for the same decoder by modifying the code to be a block code, but not convolutional code. In selected embodiments, systems may include a list decoder version of the parallel decoder that produces a fixed list size at the same delay (provided sufficient hardware) that can contain the second most likely estimate.

Communication systems and methods of transmitting and receiving data using short messages involving the use of low latency decoders in accordance with various embodiments of the invention are discussed further below.

Communication Systems

Communication systems and methods in accordance with various embodiments of the invention can be utilized to efficiently transmit short messages. Short message transmission can be useful in a variety of circumstances including (but not limited to) control signaling in wireless communication networks, device-to-device communications (e.g. Near Field Communication (NFC), Bluetooth, vehicle-to-vehicle communications), and data transmissions by Internet of Things (IoT) devices. In many embodiments, the use of low latency decoders to decode received data can enable the communication system to achieve lower latency than a comparable system employing a conventional decoding process such as the Viterbi and/or BCJR algorithms.

A communication system that includes various devices that transmit short messages in accordance with various embodiments of the invention is illustrated in FIG. 1. The communication system 100 includes a mobile phone 102 capable of communicating with a cell tower 104 that connects the mobile phone 102 to a network 106. In the illustrated embodiment, the sequence of message exchanges between the mobile phone 102 and the cell tower 104 includes the exchange of a number of short block-length messages encoded and decoded in accordance with various embodiments of the invention. In many instances, the short block-length messages are utilized by the mobile phone 102 to negotiate access to and/or transmission of data via the network 106. In several embodiments, the short block-length messages are utilized to communicate information via at least one of a Broadcast, Control Channel, a Paging Control Channel, a Common Control Channel, and/or a Dedicated Control Channel. Sometimes these messages communicate transmission parameters. As can be readily appreciated, the specific circumstances and/or the particular channels utilized to transmit and receive short block-length messages encoded in accordance with various embodiments of the invention are largely dependent upon the requirements of specific applications.

The mobile phone 102 can also utilize short block-length messages encoded in accordance with various embodiments of the invention in short-range wireless communications with other devices such as, but not limited to, another mobile phone 108. Mobile phones can also use short block-length messages encoded in accordance with various embodiments of the invention to communicate via Near Field Communication (NFC). In the illustrated embodiment, a mobile phone 110 is shown communicating with a payment terminal 112.

The use of short messages encoded in accordance with various embodiments of the invention is not limited to mobile phones. Any of a variety of devices capable of wireless communication can encode and/or decode short messages using the techniques described herein. For example, FIG. 1 illustrates a vehicle 114 communicating with the cell phone tower 104 using short messages encoded in accordance with various embodiments of the invention. The vehicle 114 is also capable of utilizing short messages encoded in accordance with various embodiments of the invention to perform Vehicle-to-Vehicle (V2V) communication and/or Vehicle-to-Everything (V2X) communication. As can readily be appreciated, any of a variety of devices can use short block-length messages encoded in accordance with various embodiments of the invention to communicate via any of a number of wired and/or wireless communication techniques including (but not limited to) NFC, short-range wireless, wireless Local Area Network, and/or cellular data network as appropriate to the requirements of specific applications.

While specific communication systems and devices that are capable of decoding short messages using low-latency decoders in accordance with various embodiments of the invention are described above with reference to FIG. 1, any of a variety of different communication systems and/or communication devices can be utilized to transmit and receive short messages in accordance with certain embodiments of the invention. For example, communication systems in accordance with a number of embodiments of the invention can include medical devices, UAVs, and/or any other type of device that can communicate via a wired and/or wireless communication channel. Communication devices, and transmitters and receivers that can be utilized within communication devices implemented in accordance with various embodiments of the invention are discussed further below.

Communication Devices

Communication devices in accordance with many embodiments of the invention can incorporate one or more transmitters, one or more receivers and/or one or more transceivers that are capable of encoding and/or decoding short messages using the techniques described herein. In many embodiments, the techniques described herein can be utilized to efficiently exchange control information to negotiate the efficient transmission of longer block-length messages using conventional communication techniques such as (but not limited to) using LDPC and/or Polar codes with higher order modulation schemes including (but not limited to) higher-order uniform QAMs and non-uniform capacity-optimized QAMs. In certain embodiments, the techniques described herein are used to transmit control and/or application data. As can readily be appreciated, the specific circumstances in which the efficient transmission of short messages is beneficial typically depend upon the requirements of particular applications.

Figure 2:
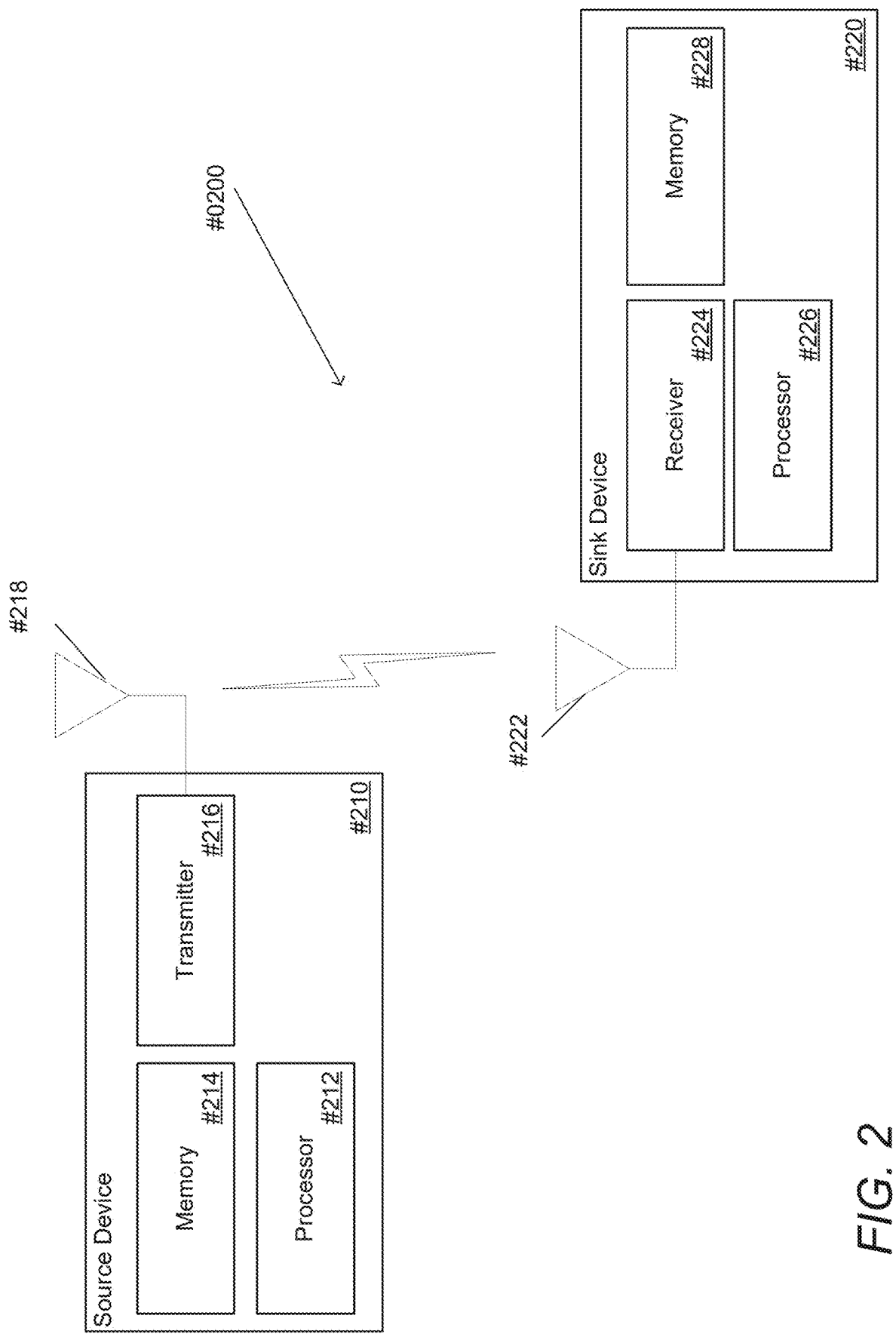
FIG. 2 illustrates a communication system capable of transmitting and receiving short messages in accordance with various embodiments of the invention.

A communication system capable of transmitting short messages encoded in accordance with various embodiments of the invention is illustrated in FIG. 2. The communication system 200 includes a first communication device 210 that includes a processor 212, memory 214, a transmitter 216, and an antenna 218. While the illustrated embodiment shows the use of an antenna 218, it should readily be appreciated that the techniques described herein are equally applicable to wired communication systems including (but not limited to) optical communication systems.

In many embodiments, the processor 212 of the first communication device 210 executes one or more applications stored in memory 214 that cause the transmission of control and/or application data via the transmitter 216. The transmitter is capable of establishing a communication channel and transmitting the control and/or application data. In many instances, the transmitted message contains encoded control information utilized to establish a communication channel for communicating application data for the same application and/or other applications. In a number of embodiments, the process of establishing the communication channel involves the use of short messages encoded using the techniques described herein. In several embodiments, the techniques described herein are used to encode short block-lengths of application data for transmission via the communication channel. As can readily be appreciated, the techniques described herein can be utilized to encode some or all of the messages transmitted via the transmitter as appropriate to the requirements of specific applications.

A second communication device 220 receives messages transmitted by the first communication device 210 via an antenna 222. In the illustrated embodiment, the second communication device 220 includes a receiver 224 that may employ a low latency decoder implemented in accordance with an embodiment of the invention, a processor 226, and memory 228. In many instances, the receiver receives transmitted messages and outputs application data that is processed by at least one application executing on the processor 226 using the machine-readable instructions of the at least one application stored in the memory 228. In many instances, the short messages received by the receiver are encoded in accordance with various embodiments of the invention. In certain embodiments, the short messages encoded in this manner are utilized to communicate control information. In a number of embodiments, the short messages encoded in this manner are utilized to transmit application data. As can readily be appreciated, the specific information transmitted via the short messages is largely dependent upon the requirements of specific applications.

While specific communication devices capable of communicating using short messages and low latency decoders are described above with reference to FIG. 2, any of a variety of different communication systems and/or communication devices can be utilized to transmit short messages via wired and/or wireless communication channels in accordance with various embodiments of the invention. Furthermore, any of the communication devices described with reference to FIG. 2 can be utilized in any of a variety of communication systems including (but not limited to) the communication systems described above with reference to FIG. 1. Specific processes for encoding short messages for transmission and decoding short messages using low latency decoding methods in accordance with various embodiments of the invention are discussed further below.

Short Message Transceivers

Figure 3:
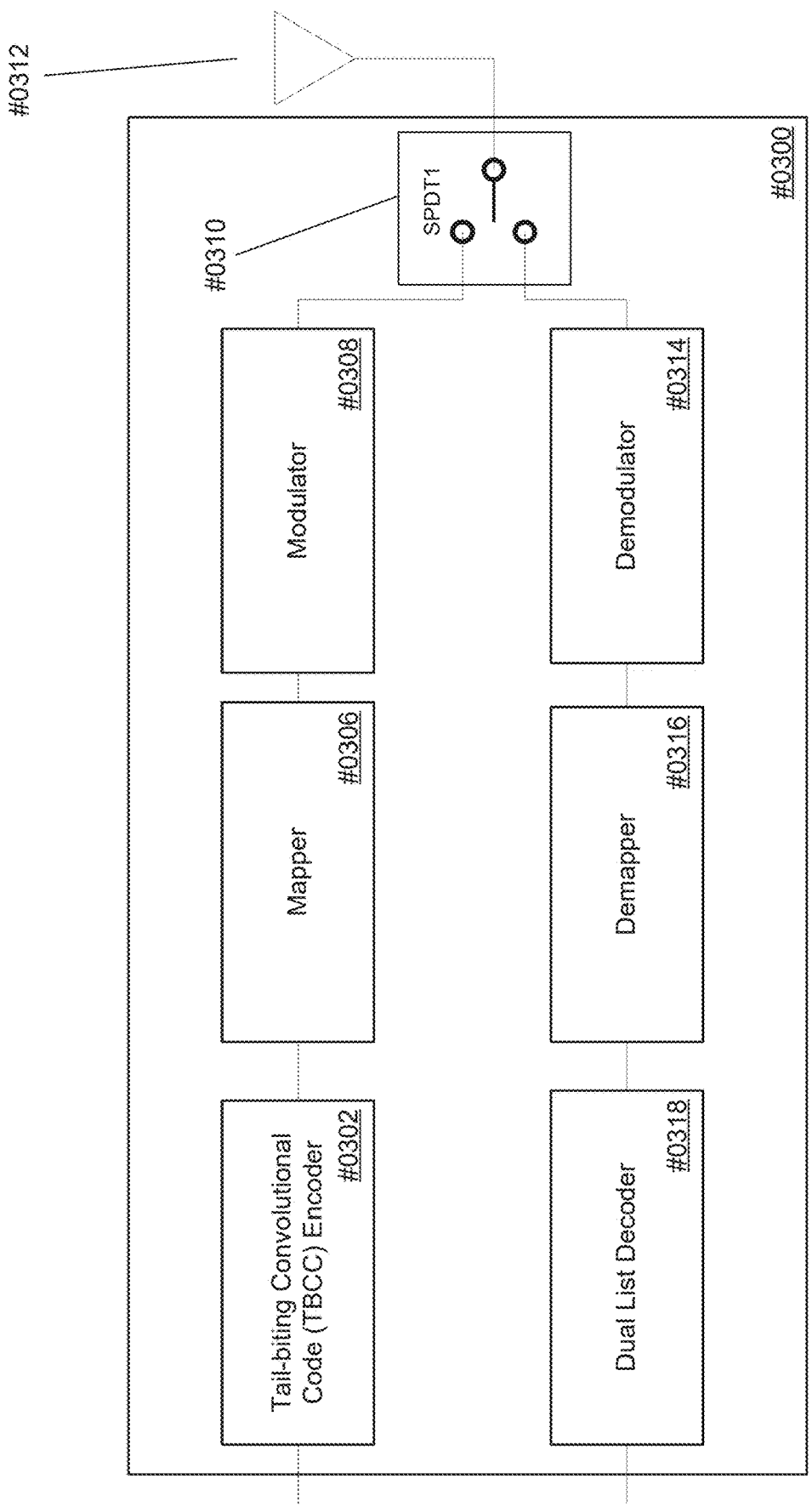
FIG. 3 illustrates a transceiver capable of transmitting and receiving short messages in accordance with various embodiments of the invention.

Transceivers, transmitters and receivers capable of transmitting and/or receiving short messages encoded in accordance with various embodiments can be implemented in a variety of ways. A transceiver capable of transmitting and receiving short messages using low latency decoding in accordance with various embodiments of the invention is illustrated in FIG. 3. The transceiver 300 receives data bits and encodes the data bits using a TBCC encoder 302. The details of the manner in which the data bits can be encoded in accordance with many embodiments of the invention is discussed further below.

The encoded bits output by the TBCC encoder 302 are received by the mapper 306, which maps the encoded bits to symbols in accordance with a specific modulation scheme. Any of a variety of binary modulation schemes can be utilized including (but not limited to) Binary Phase Shift Keyed (BPSK), and/or Non-Return-to Zero (NRZ) modulation schemes. The symbols output by the mapper 306 are provided to a modulator 308, which, for the application to wireless systems, generates an RF signal that can be transmitted via (310) one or more antennas 312 connected 310 to the modulator 308.

The antenna 312 can also be connected (310) to a receiver signal path within the transceiver. The antenna 312 can provide a received RF signal to a demodulator 314, which can output a demodulated signal 314 to a demapper 316. The demapper can 316 can generate a sequence of symbol metrics that are provided to a dual list decoder 318. In several embodiments, the symbol metrics can be log likelihood ratios with respect to each possible symbol. In a number of embodiments, the symbol metrics can be Euclidean distances with respect to each possible symbol. The specific choice of symbol metric may depend on the particular application. In the illustrated embodiment, the dual list decoder 318 is implemented using a low latency decoder. In several embodiments, the low latency decoder is a multiple list decoder that includes multiple individual list decoders, where each of the multiple list decoders generates its own list of the most likely sequences. In this way, the multiple list decoder can produce multiple lists of likely sequences that are processed in parallel. As can readily be appreciated, the specific implementation of a low latency decoder used in a receiver implemented in accordance with various embodiments of the invention is largely dependent upon the requirements of specific applications.

While a variety of different transceiver implementations are described above with reference to FIG. 3, any of a variety of transmitter, receiver and/or transceiver architectures capable of transmitting and/or receiving short messages encoded in accordance with various embodiments of the invention can be utilized as appropriate to the requirements of specific application. Various receivers that employ low latency decoders in accordance with different embodiments of the invention are discussed further below.

Encoding Using Convolutional Codes

Convolutional codes (CCs) have been widely studied and used in many systems. As the number of memory elements increases, frame error rate (FER) improves but computational complexity can increase exponentially. Recently, decoders that achieve reduced average complexity through list decoding have been demonstrated when the convolutional encoder polynomials share a common factor that can be understood as a CRC or more generally an expurgating linear function (ELF). However, classical convolutional codes avoid such common factors because they result in a catastrophic code. Systems and methods in accordance with many embodiments of the invention can reduce complexity with list decoding even when the convolutional encoder polynomials do not share a common factor. In many embodiments, an original code is decomposed into component codes that fully exclude some polynomials, which can allow an ELF to be factored from each component. List decoding of the component codes can often find the ML codeword. Some embodiments include a fallback to regular Viterbi decoding that yields excellent, FER performance while requiring less average complexity than always performing Viterbi on the original trellis. Component codes that have a shared polynomial can allow for even greater complexity reduction.

In 1973, Forney introduced Viterbi decoding for CCs in "The Viterbi Algorithm," Proceedings of the IEEE, vol. 61, no. 3, pp. 268-278, 1973, which identifies the maximum likelihood codeword. A common way of terminating a CC is to drive the states back to the zero state after processing all message bits, i.e. appending ν zeros to the end of a message, where ν is the number of memory elements in a CC. In numerous embodiments, systems and methods can provide efficient decoding of such zero-terminated CCs (ZTCCs).

In recent works, cyclic redundancy checks have been concatenated with CCs and used to expurgate CC codewords with low Hamming weights, thus improving the minimum distance $D_{min}$ and decreasing the number of nearest neighbors $A_{d_{free}}$ at $D_{min}$. Lou et al. presented an algorithm that designs optimal CRCs for ZTCCs in "Convolutional-code-specific crc code design," IEEE Transactions on Communications, vol. 63, no. 10, pp. 3459-3470, 2015. In "Serial list viterbi decoding with crc: Managing errors, erasures, and complexity." in 2018 IEEE Global Communications Conference (GLOBECOM), 2018, pp. 1-6, Yang et al. furthered the work by jointly designing distance spectrum optimal (DSO) CRCs and CCs at target frame error rates (FERs) of $10^{-2}$, $10^{-3}$, and $10^{-4}$. Yang showed that the concatenation of CCs with DSO CRCs can approach the random coding union (RCU) bound demonstrated by Polyanskiy et al. in "Channel coding rate in the finite blocklength regime," IEEE Trans. Inf. Theory, vol. 56, no. 5, pp. 2307-2359 May 2010. Since these expurgating functions do not have to be cyclic in nature, they may be referred to as expurgating linear functions (ELFs). The concatenation of an ELF with a CC is itself a CC, although the ELF is a common factor of all of the encoder polynomials making the encoder catastrophic.

The reason why the concatenation of an ELF with m states and a CC with ν states is preferable to a CC with ν+m states is that the ELF-CC can be decoded with low average complexity using list decoding, as described by Seshadri. In several embodiments, L decoding estimates may be produced either simultaneously using a parallel list Viterbi algorithm or sequentially using a serial list Viterbi algorithm (SLVA). For an ELF-CC, SLVA can be performed on a trellis with ν states rather than ν+m. Often, at the operating point of interest, the average list size of SLVA may be very close to one so that the average complexity of the decoder is essentially the complexity of performing Viterbi on a trellis with ν states.

Since the seminal paper by Seshadri and Sundberg, substantial progress has been made to reduce the complexity of the list Viterbi algorithm (LVA). Roder and Hamzaoui proposed a new implementation of LVA that is linear in both time and space by maintaining an ordered list of path metric differences using a Red-Black tree in "Fast tree-trellis list Viterbi decoding," IEEE Transactions on Communications, vol. 54, no. 3, pp. 453-461, 2006. The same performance can be achieved using a Min Heap, as illustrated by Hasham in "A new class of priority queue organizations," which is proven to have the same lowest runtime of inserting elements as the Red-Black tree. Considerable effort was dedicated to analyzing the complexity of list decoders. Yang et al. in "Joint design of convolutional code and crc under serial list viterbi decoding," 2018, and Yang et al. in "CRC-aided list decoding of convolutional codes in the short blocklength regime," IEEE Trans. Inf. Theory, February 2022, analyzed and quantified the decoding complexity of using LVA, concluding that the expected list size is a key factor in determining the overall complexity of a list decoder.

While it's possible, decoding CCs with large ν can be inefficient because the complexity of Viterbi decoding increases exponentially with ν. Systems and methods in accordance with many embodiments of the invention utilize a low-complexity decoder, which includes a pair of list decoders, which may be referred to as the Dual List Decoder (DLD). Some embodiments utilize more than two list decoders, which may be referred to as a multiple list decoder. In a number of embodiments, a full decoder is utilized that incorporates multiple partial decoders. Each partial decoder decodes a subset of a sequence of noisy received encoded symbols to produce a set of partial codewords for a sequence of message bits using a pairing of a convolutional code and an expurgating linear function that is specific to that partial decoder. The full decoder can then reconstruct a sequence of message bits that corresponds to a partial codeword in each of the sets of partial codewords generated by the partial decoders. In the event that a sequence of message bits that corresponds to a partial codeword in each of the sets of partial codewords generated by the partial decoders cannot be identified, the full decoder proceeds to fully decode the sequence of noisy received encoded symbols using a decoding process such as, but not limited to, Viterbi decoding.

In selected embodiments, systems and methods include using list decoding algorithms where the decoding complexity of a ZTCC with large ν is reduced to below the complexity of standard soft Viterbi (SSV). For ZTCCs with large ν, building the trellis and even running a single traceback may take a high computational complexity and memory space. The complexity reduction possible with list decoding can be achieved even for a CC that lacks the explicit ELF-CC structure. In various embodiments, CCs are decomposed into two shorter component codes, each of which has the ELF-CC structure. To reveal the ELF-CC structure, the polynomial for each component code may be factored into two polynomial factors, each with smaller degree than the original polynomial. One factor polynomial can act as a lower-degree CC polynomial and the other factor polynomial may be seen as an ELF that expurgates low-weight codewords of the lower-degree CC polynomial. Dual list decoding of the two-component ELF-CC codes can provide a substantial decrease in decoding complexity compared to that of using an SSV decoder on the original CC.

Dual List Decoders

DLDs in accordance with several embodiments perform list decoding of two or more component codes in parallel to find the ML codeword or, in some embodiments, a codeword that is approximately ML. Including a fallback to regular Viterbi decoding on the original trellis when needed can produce an overall decoder with excellent FER performance and less average complexity than standard SSV. In some embodiments, encoders where the component codes share a common constituent polynomial can increase the redundancy of the component codes, which can drastically improve the dual list decoder's performance and lead to significantly more complexity reduction over SSV.

In many embodiments, convolutional code encoders made up of linear finite-state shift registers can be designed to process inputs and generate outputs based on the current states of memory elements. In the context of CC, the encoding trellis is commonly represented by a matrix of generator polynomials. When describing this matrix of generator polynomials, k can be used to refer to the number of message bits per processing cycle. Also, k is the number of rows in the matrix of polynomials. The parameter ν can be used to refer to the number of memory elements, n can be used to refer to the number of output symbols, and r=k/n can be used to refer to the rate of a CC. Note that n is also the number of columns in the matrix of generator polynomials. In addition, m can be used to denote the degree of the CRC or ELF. Furthermore, log(•) can be used to denote the base-2 logarithm and $\mathbb{E}(X)$ may be denoted as the expected value of the random variable X. The polynomial representation in accordance with several embodiments is in GF(2).

Figure 4A:
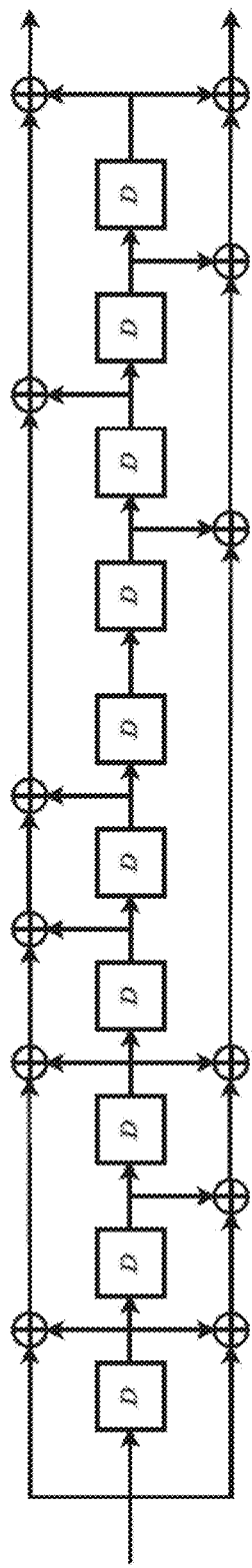
FIGS. 4A-B illustrate a convolutional code encoding circuit with v=10 having generator polynomial $(p_1(x), p_2(x)) = (1+x+x^3+x^4+x^5+x^8+x^{10}, 1+x+x^2+x^3+x^7+x^9+x^{10})$ in accordance with various embodiments of the invention.
Figure 4B:
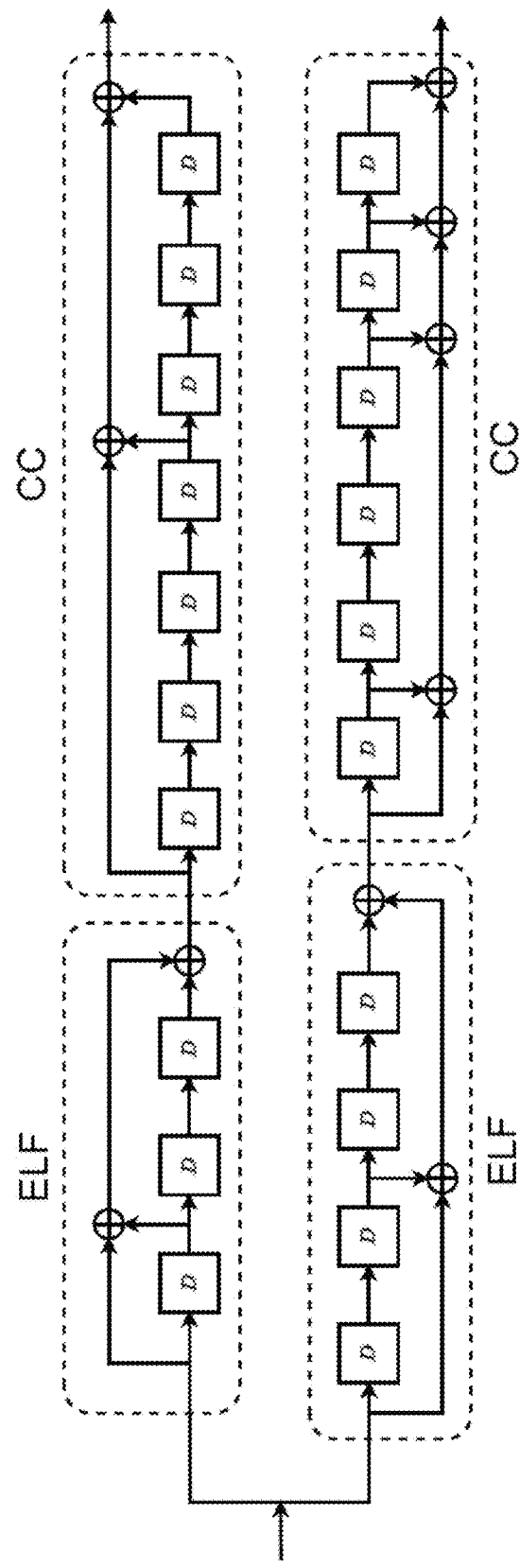

A block of K message bits, where K is a multiple of k, is processed by the convolutional encoder to produce a block of output bits. For a ZTCC, zeros may be appended to K message bits to ensure the feed-forward encoder can start from and end in the all-zero state. For example, when k=1, ν zeros may be appended to drive the encoder to the zero state. In many embodiments, the trailing zeros lead to a total number of received symbols n=1/r(k+ν) so that the actual rate is lower than generic rate of k/n that is used to describe the convolutional encoder. A convolutional code encoding circuit with ν=10 having matrix (here simply a row vector) of generator polynomials $(p_1(x), p_2(x)) = (1+x+x^3+x^4+x^5+x^8+x^{10}, 1+x+x^2+x^3+x^7+x^9+x^{10})$ in accordance with an embodiment of the invention is illustrated in FIGS. 4A-B. A ν=10 feed-forward rate-1/2 convolutional encoder with generator polynomial (2473, 3217) represented in octal in accordance with an embodiment is illustrated in FIG. 4A. The two polynomials can be decomposed into $(1+x+x^3) \cdot (1+x^4+x^7)$ and $(1+x^2+x^4) \cdot (1+x+x^4+x^5+x^6)$, respectively as illustrated in FIG. 4B. A rate-1/2 ZTCC can be decoded by performing SSV that starts and terminates at the $0_{th}$ state.

A ZTCC with a larger ν value typically results in better FER performance. In numerous embodiments, the construction complexity of a trellis is directly proportional to the number of trellis states. For a CC with ν memory elements, the associated complexity may be dictated by the number of states, which amounts to $2^\nu$. It has been demonstrated previously that a reduction in average complexity can be achieved when a "CRC polynomial" or ELF can be factored out of all of the constituent polynomials. In many embodiments, systems and methods can reduce decoding complexity for cases where the constituent polynomials can each be factored but do not share a common factor.

Looking again at FIG. 4, systems and methods in accordance with several embodiments of the invention can use complementary polynomial exclusion (CPE) to decompose a rate-1/2 convolutional code into two rate-1/1 component codes. Each component code may still have some redundancy because of termination. One component code may be created by excluding the polynomial $p_1(x)=1+x+x^3+x^4+x^5+x^8+x^{10}$. The other component code may be created by excluding the polynomial $p_2(x)=1+x+x^2+x^3+x^7+x^9+x^{10}$. Each of these component codes can be factored into an ELF and a CC so that each component code can be decoded by a list decoder. In some embodiments, $p_1(x)$ can be factored into two smaller polynomials, i.e., $1+x+x^3+x^4+x^5+x^8+x^{10}=(1+x^4+x^7)\cdot(1+x+x^3)$. Similarly, $p_2(x)=1+x+x^2+x^3+x^7+x^9+x^{10}=(1+x+x^4+x^5+x^6)\cdot(1+x^2+x^4)$. The factorizations of $p_1(x)$ may be denoted as $g_{cc,1}$ and $g_{crc,1}$. Likewise, $p_2(x)$ can be factored into polynomials defined as $g_{cc,2}$ and $g_{crc,2}$. In many embodiments, if a codeword generated by $g_{cc,1}$ satisfies $g_{crc,1}$, then it is a codeword of the code $p_1=g_{cc,1}*g_{crc,1}$. In selected embodiments, the Euclidean distance path metric obtained from both component codes can add up to the path metric obtained by decoding with SSV using the original rate-1/2 code with generator polynomial $(p_1(x), p_2(x))$.

Dual List Decoding of Convolutional Codes

Communication systems in accordance with many embodiments of the invention employ TBCCs to encode data for transmission and a low latency decoder, such as (but not limited to) a decoder implemented using multiple list decoders, to decode received data. In many embodiments, dual list decoding includes building two list decoders and running S-LVA on both until they agree on an estimate. The two list decoders can be constructed from the component codes, each with a lower v; therefore, each possesses lower complexity. For the example in FIGS. 4A and 4B, the product of component codes has a v=10 while $v_1$=7 for $g_{cc,1}$ and $v_2$=6 for $g_{cc,2}$.

Figure 5:
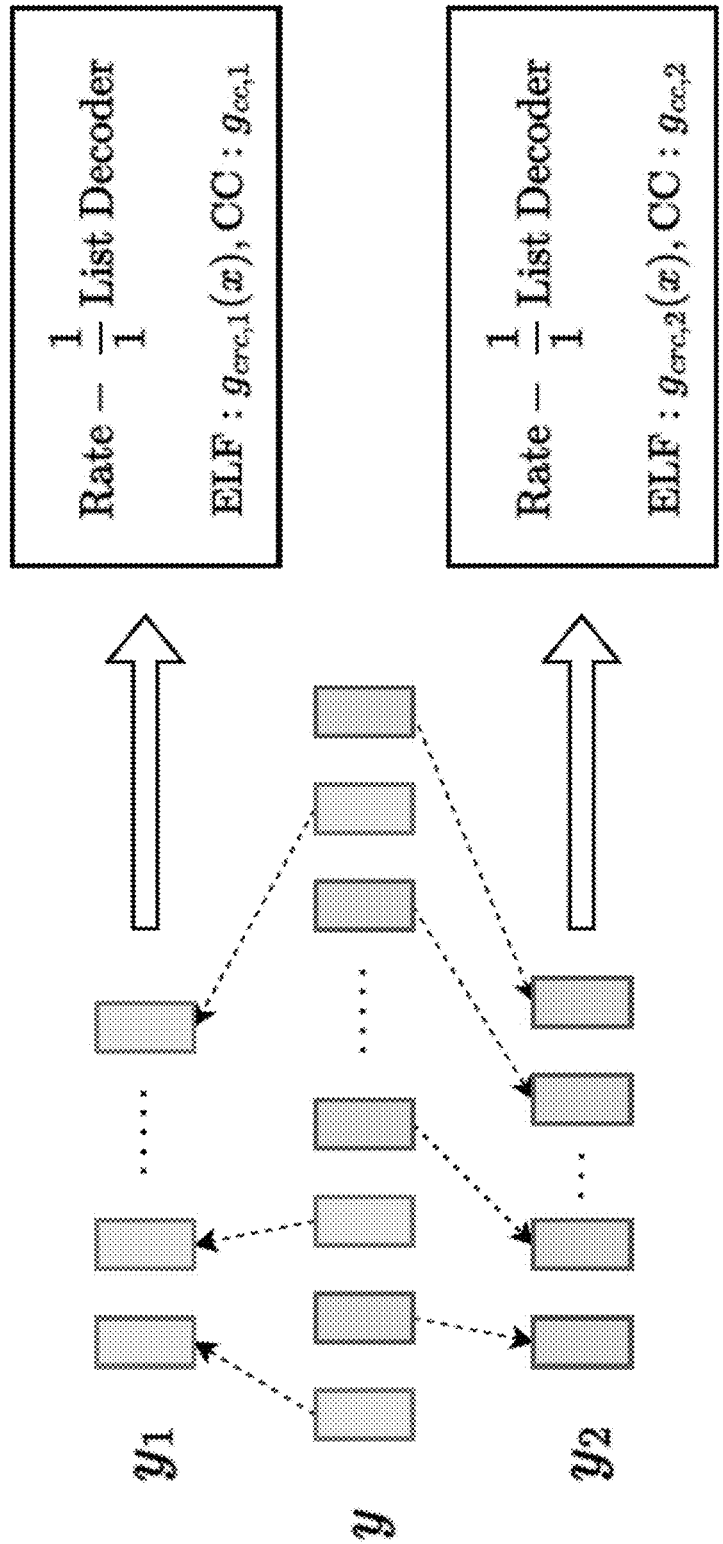
FIG. 5 illustrates a process of demultiplexing a sequence into two sequences from two component codes and decoding the sequences in accordance with an embodiment of the invention.

Since the original generator polynomials $p_1(x)$ and $p_2(x)$ are each used in only one component code, each dual list decoder in accordance with many embodiments would use only half of the received symbols. The received symbols may be demultiplexed into two sequences of symbols, based on which polynomial generated each symbol. All symbols generated by the first polynomial $p_1(c)$ may be used by one decoder and the symbols generated by the second polynomial $p_2(x)$ are used by the other decoder. A process of demultiplexing a sequence into two sequences from two component codes and decoding the sequences in accordance with an embodiment of the invention is illustrated in FIG. 5. As shown in FIG. 5, sequence y is demultiplexed into sequence $y_1$ from component code $p_1(x)$ and $y_2$ from component code $p_2(x)$. Let $y_1$ and $y_2$ denote the two sequences encoded by each component code. Sequences $y_1$ and $y_2$ are then decoded separately by two rate-1/1 list decoders for the component codes that have been factored into an ELF and CC. In many embodiments, this requires "unraveling" the received sequence, y, as if it was encoded by $p_1(x)$ and $p_2(x)$ separately and interleaved together.

In selected embodiments, the first decoder enumerates a list of possible paths through the trellis constructed using $y_1$, starting from the path with the lowest metric, pausing once a codeword that satisfies $g_{crc,1}$ is found. This codeword and its corresponding message can be stored as a candidate in an associative array. In several embodiments, the process moves on to the other decoder that runs the same steps on $y_2$. Once a new estimate that matches with an estimate that is already in the associative array is found, then the decoder outputs this estimate.

Although the rate-1 component codes contain some redundancy that protects the message bits, they may still demonstrate unsatisfactory results as the list sizes grow out of control quickly before a match in the associative array can be found. As more paths are traced from both trellises, it can require high levels of spatial and time complexity to maintain ordered lists.

Systems and methods in accordance with many embodiments of the invention utilize a paradigm of complementary polynomial exclusion with a shared polynomial (CPE-SP) as a way to increase the redundancy of the component codes and thereby improve the performance of the dual list decoders by reducing the expected list size.

Figure 6:
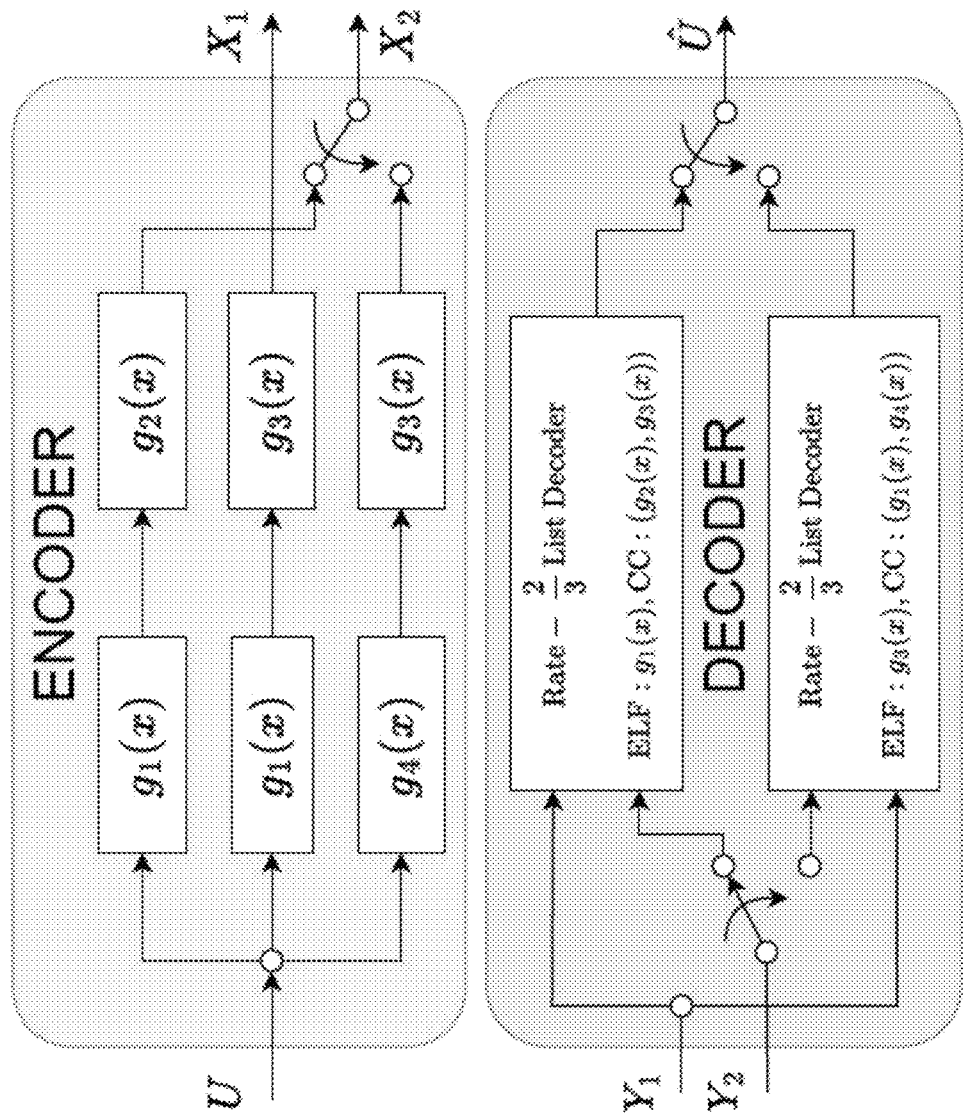
FIG. 6 illustrates a rate-1/2 convolutional encoder structure that provides increased redundancy to the component codes of a dual list decoder implemented in accordance with various embodiments of the invention.

A rate-1/2 convolutional encoder structure that provides increased redundancy to the dual list decoders in accordance with various embodiments of the invention is illustrated in FIG. 6. In many embodiments, the rate-1/2 code is decomposed into two rate-2/3 component codes created by complementary polynomial exclusion with a shared polynomial $g_1(x)g_3(x)$. The rate-1/3 mother code may be punctured to rate 1/2 by puncturing every other bit from the two polynomials $g_1(x)g_2(x)$ and $g_4(x)g_3(x)$ that are excluded from one of the component codes. The first component code in accordance with some embodiments is the rate-2/3 code with polynomials $g_1(x)g_2(x)$ and $g_1(x)g_3(x)$ so that $g_1(x)$ serves as the ELF and $[g_2(x)g_3(x)]$ is the CC. In selected embodiments, every other bit in the first component code is punctured from the output of $g_1(x)g_2(x)$. The second component code in accordance with several embodiments is the rate-2/3 code with polynomials $g_1(x)g_3(x)$ and $g_4(x)g_3(x)$ so that $g_3(x)$ serves as the ELF and $[g_1(x)g_4(x)]$ is the CC. Every other bit in the second component code in accordance with many embodiments is punctured from the output of $g_4(x)g_3(x)$.

In various embodiments, the polynomials $g_1(x)$, $g_2(x)$, $g_3(x)$, and $g_4(x)$ are selected from among all degree-5 polynomials to maximize the minimum distance of the rate-1/2 code. The selected polynomials may be defined as follows:

$$g_1(x)=x^5+x^2+1 \tag{1}$$

$$g_2(x)=x^5+x^4+1 \tag{2}$$

$$g_3(x)=x^5+x^4+x+1 \tag{3}$$

$$g_4(x)=x^5+x^4+x^2+x+1. \tag{4}$$

As can readily be appreciated, any of a variety of polynomials appropriate to the requirements of a specific application can be utilized in accordance with various embodiments of the invention. In several embodiments, the sum of the Euclidean metrics obtained from the two dual list decoders with CPE-SP for a specified message may exceed the total metric for that message decoded by SSV since the portion of the metric corresponding to output of the shared polynomial is double counted. Therefore, systems and methods in accordance with multiple embodiments includes a stopping criterion for the CPE-SP enhanced DLD with shared information.

While much of the discussion above relates to receivers that utilize two or more list decoders to reconstruct message bits from sequences of noisy received symbols, receivers in accordance with many embodiments of the invention can utilize a single list decoder. In many of these embodiments, a full list decoder can choose a sequence of message bits from sequences of message bits that correspond to partial codes words contained within a set of partial codewords produced by the partial decoder based upon a best metric computed between the full codeword and the sequence of noisy received encoded symbols. In a number of embodiments, the best metric can be determined by computing metrics for all sequences of message bits that correspond to partial codewords contained within the set of partial codewords produced by the partial decoder. As can readily be appreciated, using only a single partial decoder can reduce the number of partial codewords that are considered. In many applications, however, the additional computational effort of computing metrics for partial codewords in multiple sets of partial codewords produced by multiple partial decoders may not be necessary to achieve a required performance level. The specific number of partial decoders that are utilized within receivers and the manner in which sets of partial codewords produced by the partial decoders are utilized by the receivers in the reconstruction of message bits from sequences of noisy received symbols are largely dependent upon the requirements of specific applications in accordance with various embodiments of the invention.

Performance Comparison

Figure 7:
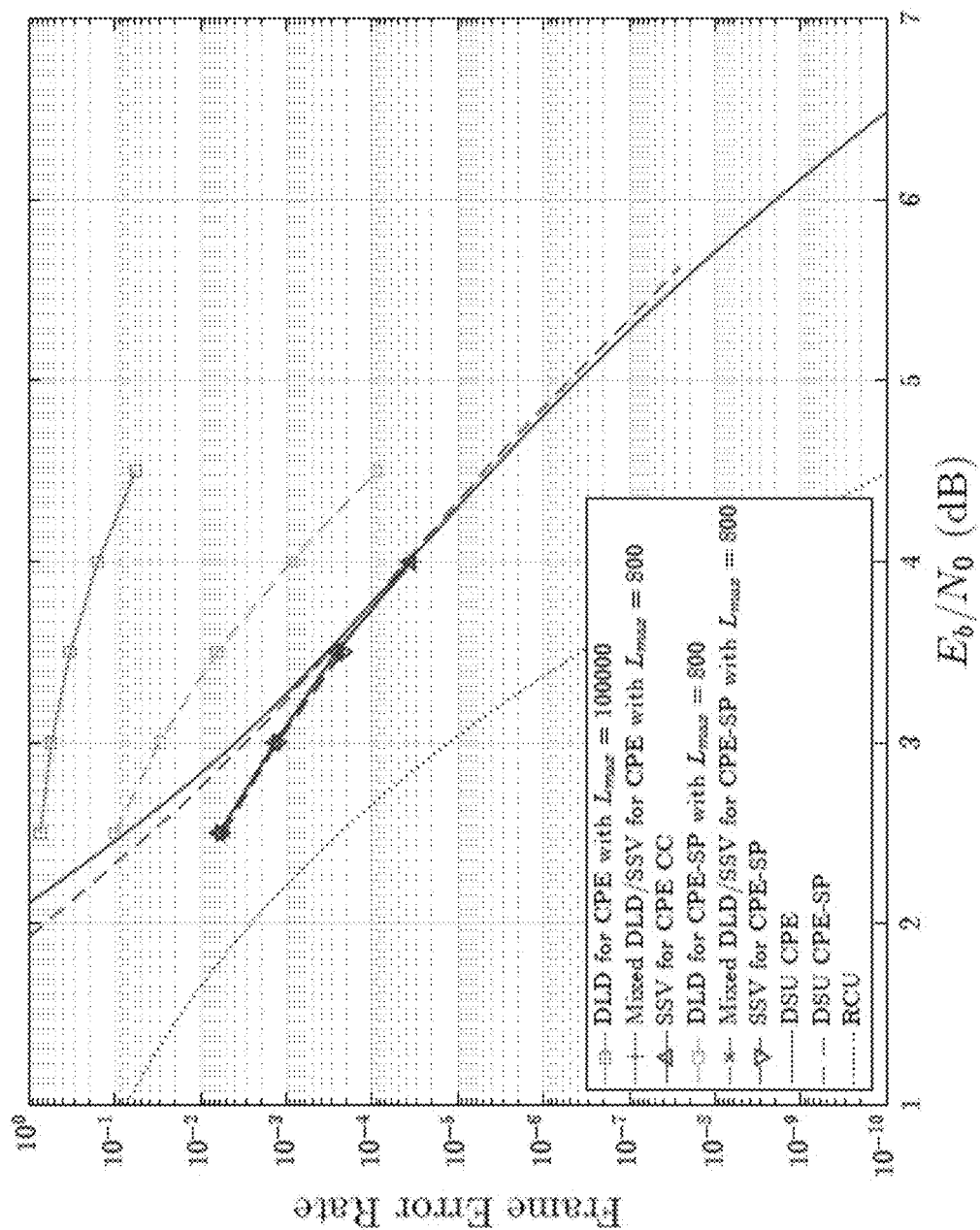
FIG. 7 illustrates a performance comparison of various types of decoders including decoders implemented in accordance with various embodiments of the invention.

FIG. 7 illustrates a performance comparison of various types of decoders. Specifically, FIG. 7 illustrates FER vs. $E_b/N_0$ simulation results for DLD, mixed DLD/SSV, and SSV decoding of two codes. The first code is the $v=10$ rate-1/2 code where CPE facilitated DLD and mixed DLD/SSV decoding. The second code is a newly designed $v=10$ rate-1/2 code obtained by puncturing a rate-1/3 code. This second code is decomposed via CPE-SP into two rate-2/3 codes that are decoded with DLD and a mixed DLD/SSV decoder. As shown in FIG. 7, to get desirable performance at the target operating point, e.g., $10^{-4}$, maximum list sizes that are much larger than $10^5$ would be needed. However, dual list decoders provide fast decoding in cases where list sizes are not exceeded. Hence, in some embodiments, systems and methods utilize a mixed decoder where dual list decoding is attempted with a relatively small constrained maximum list size $L_{max}$. If DLD declares NACK, i.e., list size exceeded, the decoder may resort to SSV decoding since it can provide an ML estimate. This method can synthesize the low decoding time of DLD and the ML performance of SSV decoding. In several embodiments, this method offers complexity reduction at high $E_b/N_0$.

The primary objective of DLD is to decompose a convolutional code with large v into smaller codes that enable serial list decoding. The ELF codes can serve to expurgate low-weight codewords. However, FIG. 7 illustrates that the FER of DLD for CPE is significantly higher than that of SSV. The rate-1/1 codes have such low redundancy that an extremely large list size is needed to recover the ML codeword. However, it also can be observed that the DLD for CPE does not make decoding errors. Rather, it simply fails to find an ELF-TB codeword and declares NACK rather than undetected errors, which means the FER curve can be interpreted as the percentage that is decoded by DLD. For example, around $E_b/N_0=4.15$ dB, DLD for CPE with a $L_{max}=10^5$ would declare NACK one out of 10 times on average.

Figure 8:
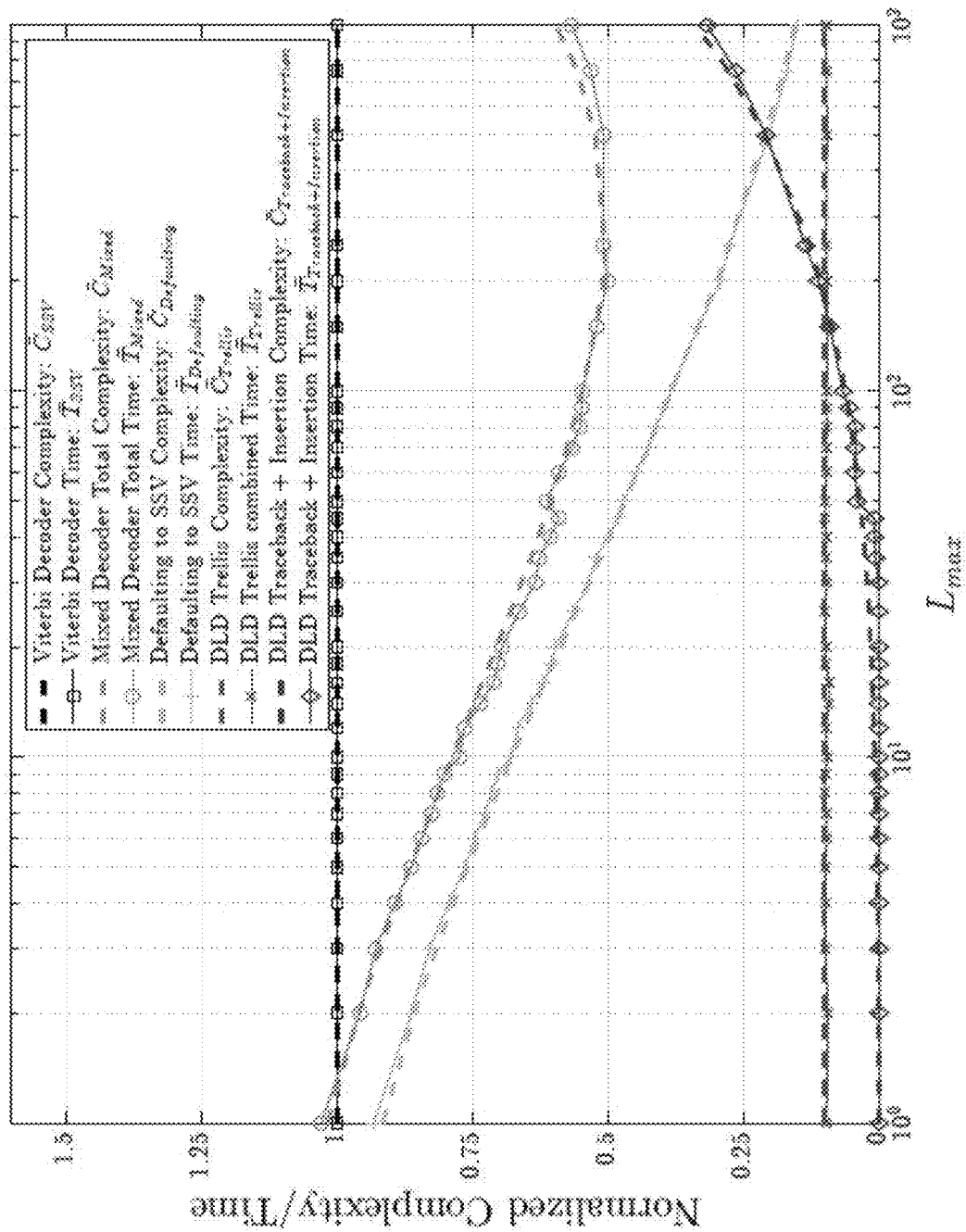
FIG. 8 illustrates various run time and complexity performances of a mixed DLD/SSV decoder in accordance with an embodiment of the invention.

FIG. 8 illustrates various run time and complexity performances of a mixed DLD/SSV decoder in accordance with an embodiment of the invention. FIG. 8 illustrates the run time and complexity of mixed DLD/SSV decoder as a function of maximum list size for the $v=10$ rate-1/2 code decoded using dual list decoding All variables are normalized by the time or complexity of the SSV decoding. In the simulation setting, $c_1=0.3$, $c_2=0.4$. As shown in FIG. 8, a mixed DLD/SSV for CPE, which falls back to run the full complexity SSV whenever DLD fails to find an ELF-TB codeword, offers both ML performance and significant complexity reduction if the $E_b/N_0$ is high enough for DLD to find an ELF-TB codeword most of the time.

In many embodiments, the dual decoding algorithm can be improved by sharing received symbols as elaborated in the previous section. As illustrated in FIG. 7, DLD for CPE-SP dramatically improves the percentage decoded by DLD and shrinks the list size required to find a match. For example, at max list size=800 the DLD for the CPE-SP system achieves an FER of $10^{-4}$ at around 4.5 dB. When FER is $10^{-4}$, DLD declares NACK every one out of 10,000 times, which means that the mixed DLD/SSV for CPE-SP decoder resorts to SSV one out of 10,000 times on average.

The overall complexity of DLD may be reliant upon the complexity of maintaining separate ordered lists in both decoders. For example, let L be a random variable defined as the "list rank" required by S-LVA to search for a codeword that passes the CRC. In a dual-list structure, two random variables $L_1$ and $L_2$ can be defined for each decoder to be the corresponding "list ranks" of the first matching codeword found respectively by decoder 1 and decoder 2. However, these two codewords may correspond to different messages, and thus be incompatible. In many embodiments, both list decoders must continue to extend their lists until a common message that passes the CRC is found to reside on both lists.

In several embodiments, theoretical complexity expressions can be developed based on the complexity expressions for SLVD of rate-1/n CRC-ZTCCs, where the overall average complexity of SLVD can be decomposed into three components:

$$C_{SLVD}=C_{SSV}+C_{trace}+C_{list} \quad (5)$$

$C_{SSV}$ denotes the complexity of summed add-compare-select (ACS) operations on a zero-terminated CC trellis, $C_{trace}$ denotes the complexity of the additional traceback operations required by SLVD, and $C_{list}$ denotes the average complexity of inserting new elements to maintain an ordered list of path metric differences. As can readily be appreciated, the number of components depends upon the number of parallel codes that are utilized.

In certain embodiments, the above metrics may be evaluated by Eq. 6 through Eq. 9, where E[I] is the expected number of insertions to maintain the sorted list of path metric differences.

$$C_{SSV}=2^{v+1}-2+1.5(2^{v+1}-2)+1.5(k+m+v)2^{v+1}+c1[2(k+m+v)+1.5(k+m)] \quad (6)$$

$$C_{trace}=3.5c_1(E[L]-1)(K+m), \quad (7)$$

$$C_{list}=c_2E[I]\log(E|I|). \quad (8)$$

$$E[I]\le(K+m)E[L]+2^v-1. \quad (9)$$

Similarly, $C_{Trellis}$ may be defined as the combined complexity of constructing the lower-order trellises for DLD. In some embodiments, $C_{Traceback+Insertion}$ is defined as the combined complexity of the additional traceback operations and the maintenance of an ordered list of path metrics required by both DLDs. $C_{DLD}$ can be used to denote the total complexity of the dual list decoder without defaulting to SSV.

$$C_{Trellis} = C_{SSV,1} + C_{SSV,2} \quad (10)$$

$$C_{Traceback+Insertion} = C_{trace,1} + C_{list,1} + C_{trace,2} + C_{list,2} \quad (11)$$

$$C_{DLD} = C_{Trellis} + C_{Traceback+Insertion} \quad (12)$$

In order to compare the complexity of DLD and that of SSV, the normalized complexity C can be defined as the complexity divided by the complexity of performing SSV, i.e., $$\overline{C}_{DLD} = \overline{C}_{Trellis} + \overline{C}_{Traceback+Insertion} \quad (13)$$

In many embodiments, the complexity of a mixed decoder is $C_{DLD}$ plus the complexity of running SSV whenever DLD declares NACK. The time measured for each component in equation 13 in accordance with several embodiments are normalized by $T_{SSV}$ to get $\overline{T}$. The run-time of the aforementioned components was recorded on an Intel E5 2670 using Visual Studio C++ 14. FIG. 8 illustrates the normalized complexity derived from Eq. 10-13 and the normalized runtime. In various embodiments, normalization is done by dividing the complexity or runtime associated with SSV, which includes performing ACS operations on the trellis and a single traceback producing the best metric. FIG. 8 shows the normalized complexity and normalized runtime match. In addition, the complexity of CPE-DLD is shown to be dominated by the complexity of maintaining an ordered list of path metric differences with high constrained maximum list size.

Figure 9:
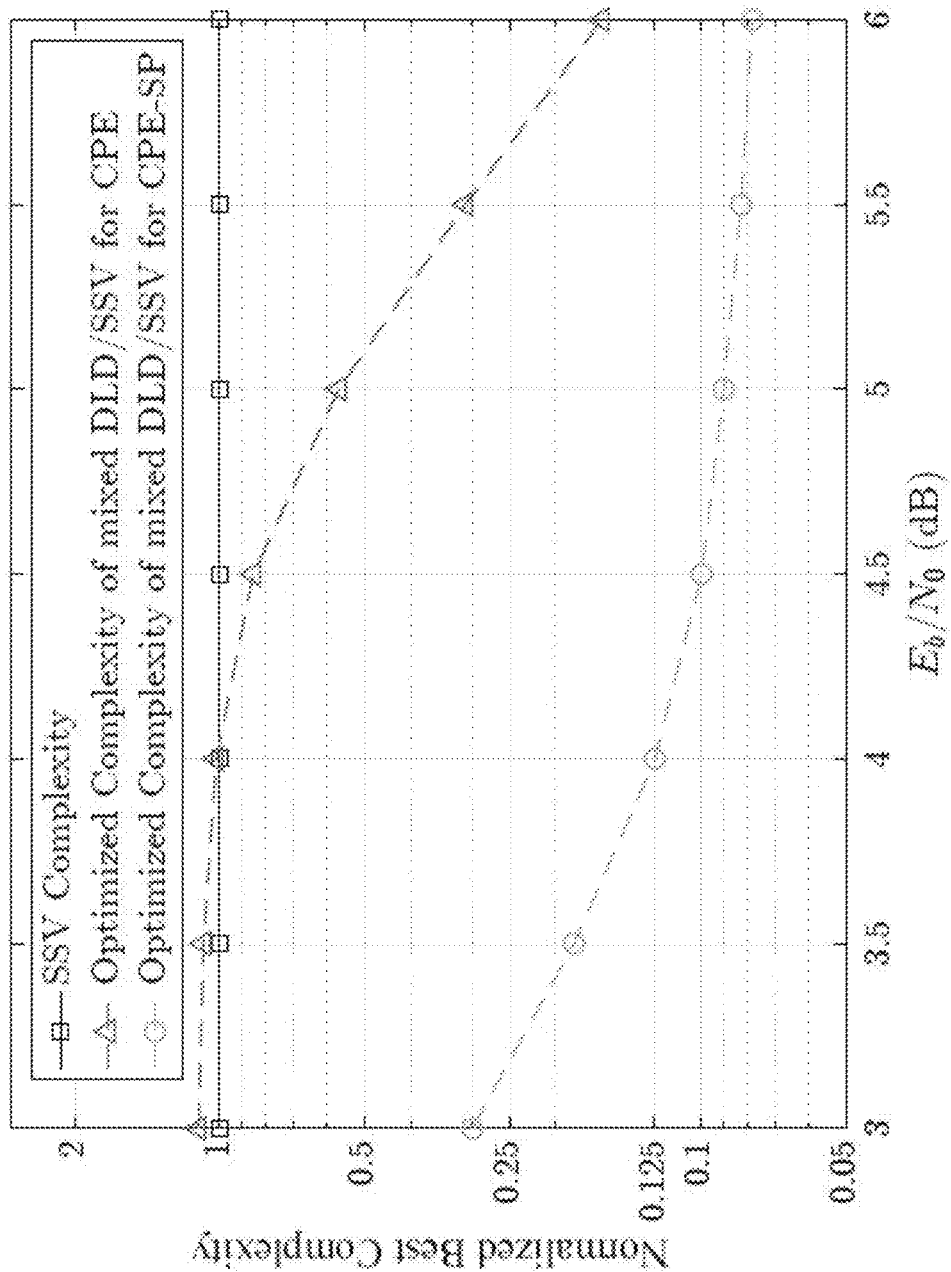
FIG. 9 illustrates various normalized complexities for optimized maximum list sizes across different $E_b/N_0$ for two codes.

FIG. 9 illustrates various normalized complexities for optimized maximum list sizes across different $E_b/N_0$ for two codes. The first code is the v=10 rate-1/2 code. The second code is the newly designed v=10 rate-1/2 code obtained by puncturing a rate-1/3 code. Normalization may be performed with respect to SSV. FIG. 9 shows that the mixed DLD/SSV for CPE-SP has a much lower complexity at $E_b/N_0$=3.0 and further converges to ~0.07 at high $E_b/N_0$. The mixed DLD/SSV for CPE, on the other hand, started with a complexity higher than that of SSV decoding and decreased quickly after $E_b/N_0$=4.5.

Figure 10:
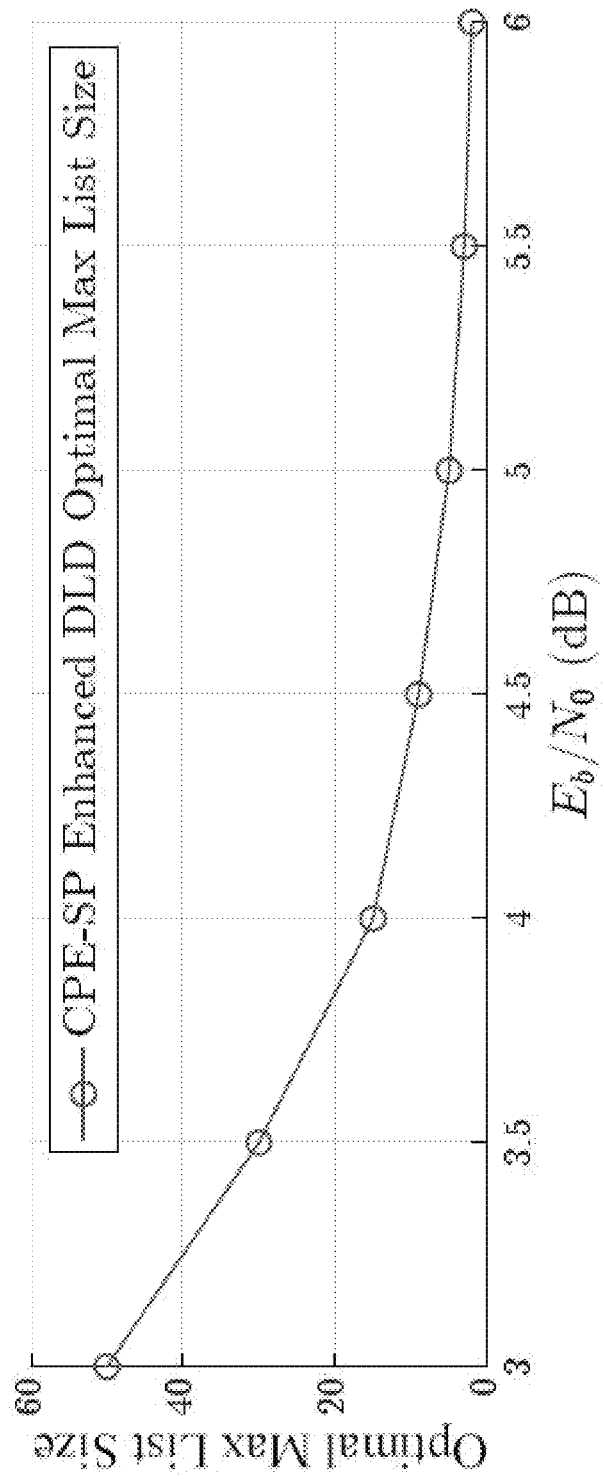
FIG. 10 illustrates an optimal constrained maximum list size vs. $E_b/N_0$ for CPE-SP Enhanced DLD that uses a rate-1/2 code produced by puncturing a rate-1/3 code given by (2267, 3613, 2353).

FIG. 10 illustrates an optimal constrained maximum list size vs. $E_b/N_0$ for CPE-SP Enhanced DLD that uses a rate-1/2 code produced by puncturing a rate-1/3 code given by (2267, 3613, 2353). At each $E_b/N_0$, a selection of list sizes ranging from 1-1000 is considered and the best list size is the one that results in the lowest runtime. As $E_b/N_0$ increases, the optimal max list size converges to 1. FIG. 10 demonstrates that the optimal constrained maximal list size converges to 1 as $E_b/N_0$ increases for mixed DLD/SSV for CPE-SP. This is because the ML and correct decoding tend to be found very early in both lists at high $E_b/N_0$.

Although specific methods of transmitting and receiving short messages using dual list decoders are discussed above, many different methods of transmitting and receiving short messages can be implemented in accordance with many different embodiments of the invention. For example, one of ordinary skill in the art will appreciate that methods of communication described above can be implemented on other platforms as appropriate to the requirements of specific applications of embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

Additional disclosure can be found in the manuscripts filed herewith, which are incorporated by reference in its entirely. The references to additional works made in the footnotes are incorporated by reference in their entireties. Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A receiver for reconstructing a sequence of message bits from a sequence of noisy received encoded symbols, comprising:
   a full decoder capable of receiving the sequence of noisy received encoded symbols and outputting a reconstructed sequence of message bits, where the full decoder further comprises:
      a first partial decoder capable of processing a first subset of the sequence of noisy received encoded symbols to produce a first set of partial codewords that each correspond to a possible sequence of message bits using a first convolutional code and a first expurgating linear function, where the first subset of the sequence of noisy received encoded symbols corresponds to symbols of a first partial codeword; and
      a second partial decoder capable of processing a second subset of the sequence of noisy received encoded symbols to produce a second set of partial codewords that each correspond to a possible sequence of message bits using a second convolutional code and a second expurgating linear function, where the second subset of the sequence of received noisy encoded symbols corresponds to symbols of a second partial codeword, and the first and second subsets of the sequence of noisy received encoded symbols are distinct;
   wherein the full decoder is further capable of reconstructing a sequence of message bits using the first set of partial codewords and the second set of partial codewords.

2. The receiver of claim 1, wherein the reconstructed sequence of message bits corresponds to both a first partial codeword contained within the first set of partial codewords and a second partial codeword contained within the second set of partial codewords.

3. The receiver of claim 2, wherein the full decoder is further capable of directly decoding the sequence of noisy received encoded symbols using a full convolutional code when no suitable sequence of message bits can be found that corresponds to both a first partial codeword contained within the first set of partial codewords and a second partial codeword contained within the second set of partial codewords.

4. The receiver of claim 3, wherein the full decoder comprises a Viterbi decoder that is capable of directly decoding the sequence of noisy received encoded symbols using the full convolutional code.

5. The receiver of claim 3, wherein a given sequence of message bits is suitable when the given sequence of message bits corresponds to a full codeword having a metric computed between the full codeword and the sequence of noisy received encoded symbols that is below a threshold.

6. The receiver of claim 1, wherein the full decoder is capable of reconstructing the reconstructed sequence of message bits by:
- choosing a sequence of message bits from sequences of message bits that correspond to a partial codeword contained within at least one of the first set of partial codewords and the second set of partial codewords; and
- wherein the chosen sequence of message bits corresponds to a full codeword having a best metric computed between the full codeword and the sequence of noisy received encoded symbols, where the best metric is determined by computing metrics for all sequences of message bits that correspond to a partial codeword contained within at least the first set of partial codewords and the second set of partial codewords.

7. The receiver of claim 1, wherein the first and second subsets of the sequence of noisy received encoded symbols are mutually exclusive.

8. The receiver of claim 1, wherein the first and second subsets of the sequence of noisy received encoded symbols are not mutually exclusive.

9. The receiver of claim 1, wherein at least the first subset of the sequence of noisy received encoded symbols corresponds to encoded symbols that remain after some symbols have been punctured.

10. The receiver of claim 1, wherein the first and second partial decoders are serial list Viterbi decoders.

11. The receiver of claim 1, wherein the first and second partial decoders are parallel list Viterbi decoders.

12. The receiver of claim 1, wherein each of the first and second subsets of the sequence of noisy received encoded symbols corresponds to symbols of a zero-terminated convolutional code.

13. The receiver of claim 1, wherein each of the first and second subsets of the sequence of received noisy encoded symbols corresponds to symbols of a tail-biting convolutional code.

14. The receiver of claim 1, wherein the first partial decoder is further capable of processing the first subset of the sequence of noisy received encoded symbols to produce the first set of partial codewords for the sequence of message bits using the first convolutional code and the first expurgating linear function by:
- producing a list of partial codewords containing the first set of partial codewords using a list decoder based upon the first convolutional code; and
- identifying the first set of partial codewords by verifying partial codewords from the list of partial codewords that pass a check based upon the first expurgating linear function.

15. A transmitter comprising:
- a message encoder capable of receiving a sequence of message bits and outputting a sequence of encoded bits, where the message encoder comprises:
  - a first encoder configured to receive the sequence of message bits and output a first partial codeword based upon a first convolutional code and a first expurgating linear function;
  - a second encoder configured to receive the sequence of message bits and output a second partial codeword based upon a second convolutional code and a second expurgating linear function;
  - wherein the message encoder is further configured to generate a full codeword by combining the first partial codeword and the second partial codeword;
- a mapper, coupled to the message encoder, capable of mapping the full codeword to a sequence of symbols; and
- a modulator, coupled to the mapper, capable of outputting a signal for transmission via a communication channel based upon the sequence of symbols.

16. The transmitter of claim 15, wherein each symbol in the sequence of symbols depends upon only one of the first partial codeword and the second partial codeword.

17. The transmitter of claim 15, wherein at least one symbol in the sequence of symbols depends upon both the first partial codeword and the second partial codeword.

18. The transmitter of claim 15, wherein each of the first convolutional code and the second convolutional code is a zero-terminated convolutional codes.

19. The transmitter of claim 15, wherein each of the first convolutional code and the second convolutional code is a tail-biting convolutional codes.

20. The transmitter of claim 15, wherein the bits of the first partial codeword and the bits of the second partial codeword are not mutually exclusive.

* * * * *